United States Patent [19]

Smith et al.

[11] Patent Number: 4,838,404
[45] Date of Patent: Jun. 13, 1989

[54] TOKEN OPERATING SYSTEM FOR AN ELECTRONIC DEVICE

[75] Inventors: James E. Smith; Mark A. Nash, both of Morgantown, W. Va.

[73] Assignee: West Virginia University, Morgantown, W. Va.

[21] Appl. No.: 935,830

[22] Filed: Nov. 28, 1986

[51] Int. Cl.⁴ .............................................. G07F 7/08
[52] U.S. Cl. .................................... 194/212; 194/214; 250/569
[58] Field of Search ................ 194/205, 209, 211–214; 235/470, 488; 250/569

[56] References Cited

U.S. PATENT DOCUMENTS

| 504,011 | 8/1893 | Wratitsch et al. | |
| 1,097,033 | 5/1914 | Larson . | |
| 1,124,814 | 1/1951 | Scharold . | |
| 2,840,213 | 6/1958 | Gilmour | 194/212 |
| 2,983,354 | 5/1961 | Ember et al. | 194/4 |
| 3,155,211 | 11/1964 | Morris et al. | 194/1 |
| 3,362,515 | 1/1968 | Yamamoto et al. | 194/4 |
| 3,379,295 | 4/1968 | Varley | 194/4 |
| 3,778,637 | 12/1973 | Arita | 307/140 |
| 4,066,910 | 1/1978 | Swift | 250/569 X |
| 4,139,764 | 2/1979 | Petrini et al. | 194/211 X |
| 4,249,648 | 2/1981 | Meyer | 194/102 |
| 4,371,071 | 2/1983 | Abedor et al. | 194/212 |
| 4,381,430 | 4/1983 | Smock et al. | 200/35 R |
| 4,593,361 | 6/1986 | Otten | 194/217 X |

OTHER PUBLICATIONS

Leonard A. Jason, DePaul University, pp. 269–272.
M. Durbin & L. A. Jason–"A Token-Actuated Time for Line-Voltage Devices"–Behavior Research Methods, Instruments & Computers, 1984, pp. 294–296.

Primary Examiner—F. J. Bartuska
Attorney, Agent, or Firm—Arnold B. Silverman; Suzanne Kikel

[57] ABSTRACT

A token and photo-detector circuitry in an electronic device used for supplying electrical power to an external appliance for an amount of time represented on the token. The token contains encoded information in a base numbering system in several regions of the token and this information is read by the circuitry to represent a time value whereby the circuit relays power to the appliance for an equivalent length of time. Several tokens may be deposited into the device in any orientation so as to accumulate time for use of the appliance. The device is programmable and can communicate with the user/operator with the appropriate hardware additions.

8 Claims, 3 Drawing Sheets

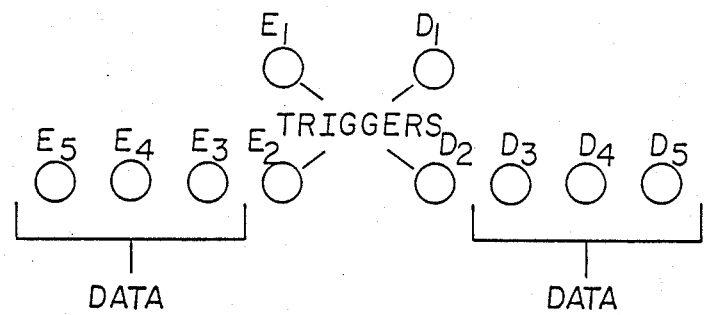
FIG. 5  TOKEN READER ARRAY
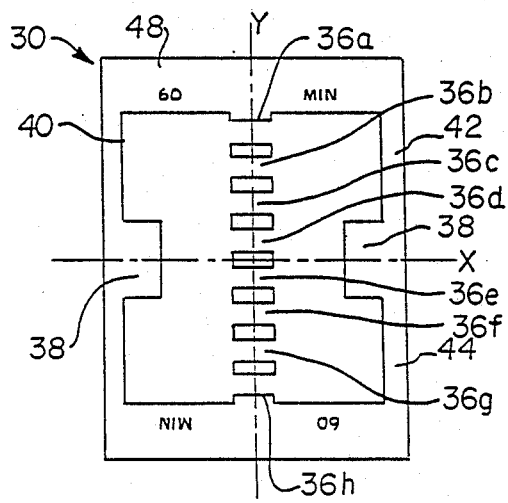
FIG. 6A
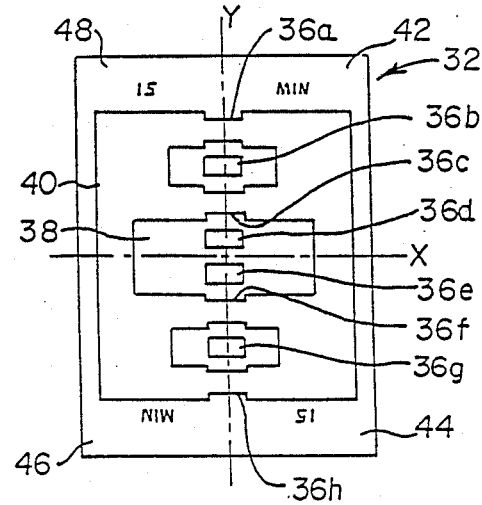
FIG. 6B
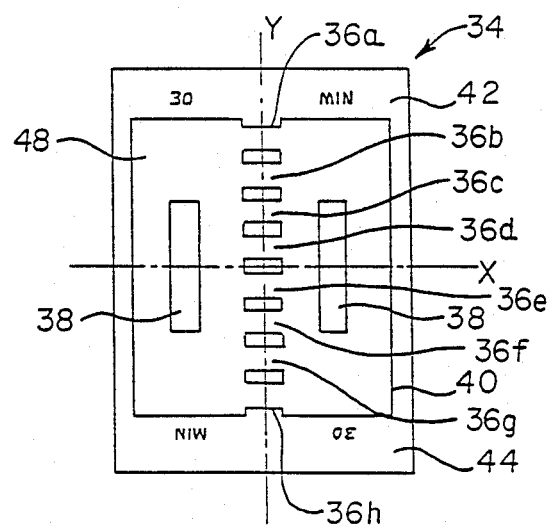
FIG. 6C

TOKEN OPERATING SYSTEM FOR AN ELECTRONIC DEVICE

FIELD OF THE INVENTION

The present invention relates to an electronic device with an improved photodetector circuitry activated by an improved token. It also relates to an apparatus and method of using the apparatus to induce desired behavior from a human or animal by controlling electric power to an appliance. More particularly, it relates to a token containing encoded information which appears on the token a plurality of times and arranged thereon such that the photodetector circuitry reads the encoded information regardless of its orientation or velocity with which it travels through the electronic device.

DESCRIPTION OF THE PRIOR ART

The prior art has generally described the use of tokens and circuitry in a variety of electronic devices for controlling an electrically energized appliance. Illustrative is U.S. Pat. No. 4,371,071. The apparatus of this patent detects a circular token having a particular combination of size, shape, color, hue, reflectivity and light absorbency. This token is sensed when it interrupts the path between a monochromatic light source and its photodetectors. Detection of the genuineness of this token requires that the token travels down through inclined pathways so light can be transmitted through the selected token. Counterfeit tokens or foreign objects do not have the tendency to shut the system down as a result of tampering with the apparatus and to remain shut down until it is reset. This apparatus and token is used to modify desired behavior in a human or animal through the "token economy" system.

Prior art also describes rectangular tokens and a system for identifying the tokens or an apparatus operated by the tokens by passing of these tokens by an electronic sensing arrangement. Illustrative are U.S. Pat. Nos. 3,379,295 and 3,362,515. Such tokens contain magnetic ink or a magnetic film formed on the surface of the token in which ink or film represents a monetary value or contains coded information regarding the user of these tokens. Electronic reading of the information stored on these tokens requires proper and specific orientation when being inserted into the electronic systems.

Prior art further describes box-like housings for receiving a token or coin, which token may be specially designed to be accepted by the sensing systems contained therein. Illustrative are some of the above referred to references in addition to U.S. Pat. Nos. 1,097,033; 3,778,637 and 4,249,648. Prior art also describes a method of inducing desired behavior from an animal or human by controlling electrical power to an appliance. Illustrative is the above-mentioned U.S. Pat. No. 4,371,071.

There is therefore lacking in the prior art a teaching of a tamper proof token and electronic device such that the electronic device remains jammed if tampered with until it is reset. There is further lacking a token designed such that its authenticity is confirmed regardless of its orientation into the electronic device, particularly in the instance where the token is rectangularly shaped. There is further lacking an electronic device containing a circuitry such that it can be used to electronically operate and interface with a television, a computer, a VCR, a stereo, etc. There is further lacking an electronic device which can be programmed as such so as not to be operated during certain hours There is further lacking in the prior art a token with encoded information thereon and a photodetecting system for its authentication. There is further lacking in the prior art a token economy system oriented specifically toward helping parents or guardians reduce their children's overuse of an electronic entertainment appliance while simultaneously increasing other activities which may be active or inactive. There is a further lacking in the prior art of an electronic device designed such that an adult has complete control of the use of the electronic device. There is a further lacking in the prior art of a device capable of using feedback via an alpha-numeric display and key pad.

SUMMARY OF THE INVENTION

The present invention has solved the above-described problems by providing an electronic device comprising a housing, locking door means, slot means, a switch, a display and a buzzer and/or an LED display. The slot means contains an array of photo-detectors which read a specially designed plastic token. Each of these tokens is designed to trigger the photo-detectors using a binary coded decimal format which accumulates time on a countdown timer. This timer controls a set of relays that provide current to the desired receptacles.

The two doors are provided with locks which protect a plug-in area for an electrical appliance that is to be monitored and a containment area for the spent tokens. The buzzer is designed to warn the user of imminent interruption of power, which is programmable. A multimode switch provides an on/off function plus hold and override positions, and the display of time is a three-digit numeric LED display.

In the present invention, a generally rectangular shaped, thin token contains a photo-developed plastic film on which the encoded value is recorded and which film is encased between two sheets of a synthetic resin such as plastic. The encoded information is in a base numbering system which is read by the circuitry as a time value. This photo-developed plastic film contains cut-out regions such that these cut-out regions appear as being clear sections whereas the film appears as being blackened-in sections between the sheets of plastic of the token. The code is repeated once in each of four quadrants each oriented so as to provide undirectionality. The code is also designed such that the clear sections in the matrix register in the electronic circuitry as a binary number one whereas the blackened-in sections represent a binary zero. These clear and blackened sections are arranged such that the encoded information is read by the circuitry as being three 4 bit binary coded decimal digits.

The code pattern on the token represents time in hours, tens of minutes, and unit minutes representation. It is read by a microprocessor whereby a photo-detector array consists of five source detector pairs, three of which are used to read the three BCD coded numbers on the token, and two of which trigger a central processing unit of the microprocessor indicating when each of the four bits of each of the three numbers are to be read It is an object of this invention to provide a token and a photodetecting circuitry for an electronic device that is tamperproof and yet easy to use. The token is made of a durable material; is of a sufficient size so that it is not easily lost or swallowed by children; and is loadable in the system with any possible orientation to the slot, i.e., upside down, backwards, etc., with the photo-detectors reading the encoded information thereon.

It is a further object of this invention to provide an apparatus and method of its use such as to induce a desired behavior from a subject by controlling electric power to an electronic entertainment appliance which use to such appliance is equated with the earning of a token. The electronic device is designed as a temporary behavior model structure in helping parents or guardians to establish a desired behavior pattern for children. An override switch is included which can be operated by parents or guardians, thereby eliminating the use of tokens for operation of the appliance. It is a further object of this invention to provide an electronic device which cannot be activated until a token is fully inserted therein preventing the user from pulling the token out once inserted. Dropping a token in and then pulling it out results in zero time. Bogus tokens freeze the system completely.

These and other objects of the invention will be fully understood from the following description of the invention, on reference to the illustrations appended hereto

BRIEF DESCRIPTION OF THE DRAWINGS

FIG. 5 is a schematic representation of the token reader array;

FIGS. 6a-6c illustrate different value tokens of a preferred embodiment of the present invention;

DESCRIPTION OF THE PREFERRED EMBODIMENT

Figure 1:
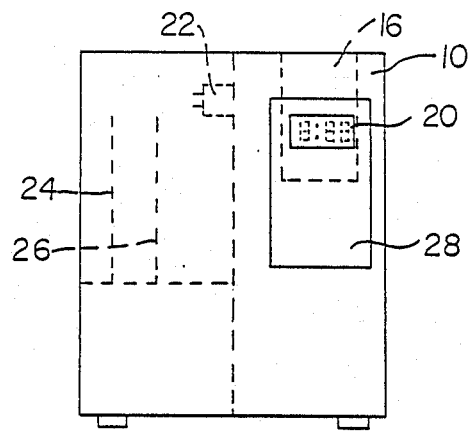
FIGS. 1-4 illustrate schematic views of the token device of the invention.
Figure 2:
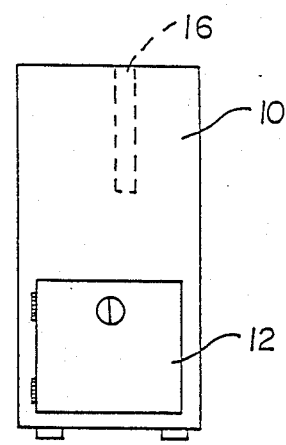
Figure 3:
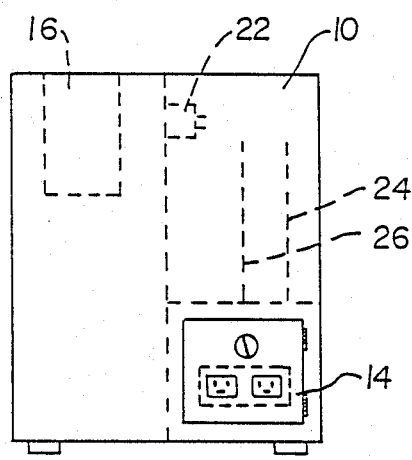
Figure 4:
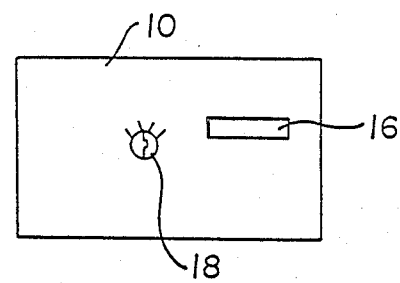

The electronic device and the token used by the electronic device of the present invention may be used for controlling the power supply to an external electrical appliance, such as a television set for a specific amount of time accumulated by the token or tokens deposited into the device. These tokens may be earned by children, retarded adults, and others upon the completion of a task, or in some instances, granted as a reward for not exhibiting an undesirable behavior. Such granting or earning of tokens is referred to as a "token economy," used in a behavioral modification program to gradually phase in a desired behavior into a subject's normal behavioral repertoire. An example of a "token economy" for behavior modification is disclosed in the above-mentioned U.S. Pat. No. 4,371,071, which is incorporated herein by reference.

The nature of a token economy system requires that there be a controlled medium of exchange which is a token, and a commodity or service for which there is a demand which is the viewing of television. The electronic device of the invention regulates power to an electronic entertainment appliance such as a television or a computer and reads and records time value denominations appearing on the token of the present invention for such regulation to the appliance for a certain length of time. The unique design of a token and its associated reader system are entailed in the token system of the present invention.

FIGS. 1 through 4 illustrate an electronic device of a preferred embodiment of the invention. It consists of a box-like housing 10 which may be clear plastic measuring 6×10×12 inches with outside features of two locking doors 12, 14; a token reader slot 16; a four position keyed switch 18; a three digit LED display 20; a buzzer (not shown); a relay 22; a microprocessor board 24; a power supply board 26; and a display board 28. One key locked door 14 gives access to a plug-in area having AC outlets for an appliance. The plug of the appliance goes into this area, and the electronic device is connected to a standard 110 volt outlet. Internally, the box contains a power supply that converts the standard 110 volts AC to the required AC and DC voltages necessary to operate both the internal electronics and the appliance to be monitored.

Door 12 is key locked and protects a containment area for the spent tokens. A buzzer or a voice synthesizer is designed to warn the user of the imminent interruption of the power. This feature may be programmable into the electronics of the invention which is to be discussed further hereinafter. Switch 18 provides an on/off function plus hold and override positions. This permits the user to interrupt the power supplied to the appliance for a time period and could easily be adapted to continue the power supply for the remaining time on the LED display 20. The buzzer and LED display timer 20 are items available in the industry. Even though not shown, an access door is provided for necessary repairs.

FIGS. 6a-6c illustrate three tokens 30, 32, 34 each having a different time value denomination encoded thereon. In referring to these FIGS. 6a-6c there is shown for each token a generally rectangular shaped body. This body may, for example, measure approximately 1.5" across its width and 3.00 inches along its length. As seen, each token consists of a black on white pattern with several blackened areas 36a-36h running along its longitudinal axis with the whitened areas 38 and blackened areas 40 being symmetrical about this longitudinal axis. Blackened areas 40 including areas 36a-36h for each token 30, 32, 34 have not been blackened in, but it is to be understood that the construction of the tokens 30, 32, 34 is such that areas 40 are darker than that of areas 38, which construction is explained shortly.

The encoded information in a time value denomination is represented by these whitened and blackened areas 38, 40 respectively, to be discussed further hereinafter.

The whitened areas 38 of the tokens 30, 32, 34 are constituted by two thin sheets of a synthetic resin which may be plastic, and the blackened areas 40 may be comprised of a photo-developed plastic film upon which the encoded values are impressed. The photo-developed plastic film is placed between the two plastic sheets and permanently fixed by an adhesive or self-bonding, and encased therebetween through a suitable process.

Figure 7:
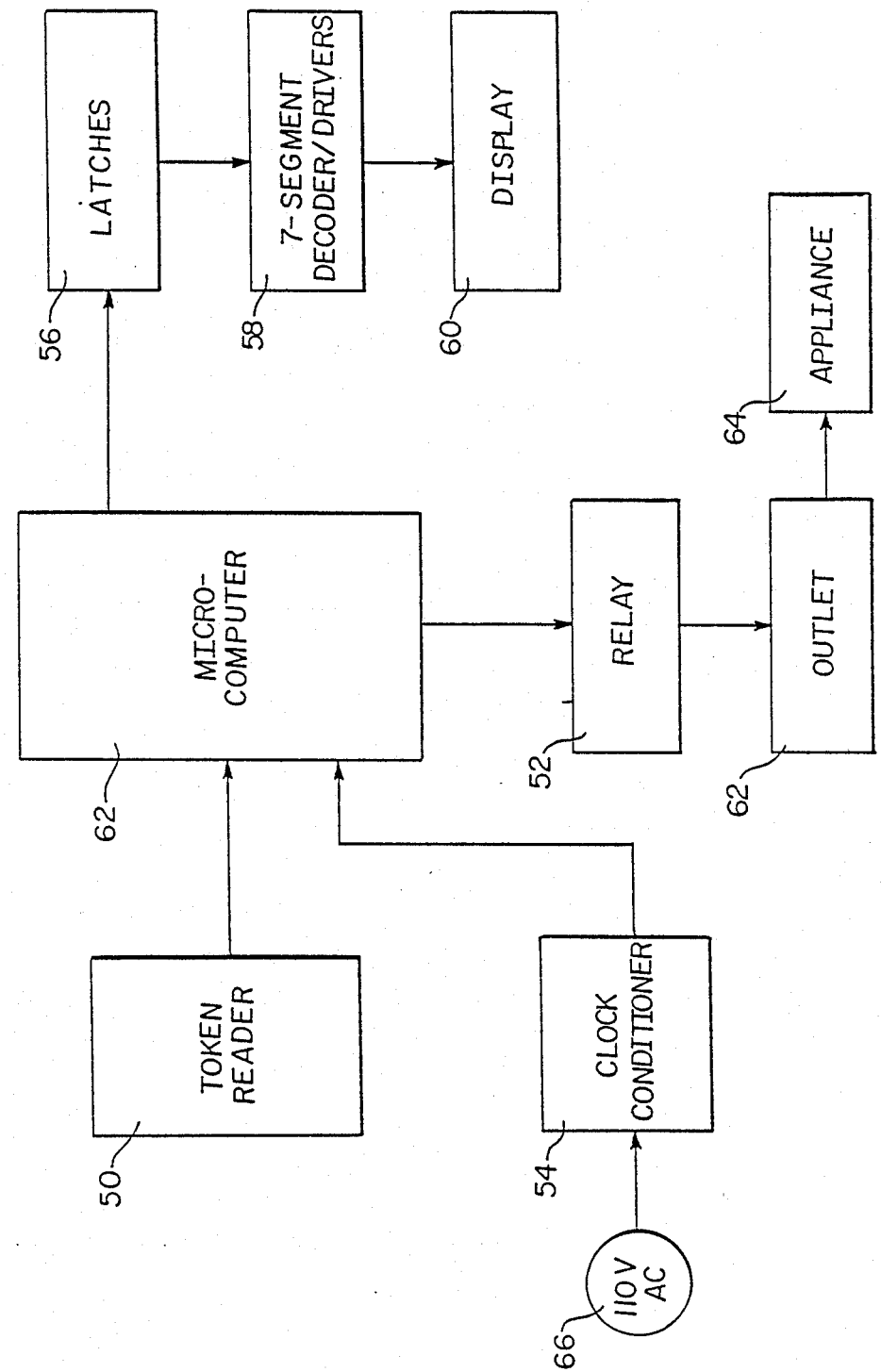
FIG. 7 is a flow diagram for a circuit for electronically receiving and detecting tokens in the system of the present invention, such tokens being those shown in FIGS. 6a-6c, and including the token reader array of FIG. 5.

The x and y axes shown in FIGS. 6a-6c for each token 30, 32, 34 separate each token into four quadrants or regions 42, 44, 46, 48 and the coded information is represented by the unique black and white color pattern repeated in each quadrant with the blackened longitudinal areas 36a-36h acting as a register for the optical reader in the electronic flow diagram of FIG. 7 for reading the coded information in one direction. The coded information is read by the circuitry as being three 4 bit binary coded decimal digits. The clear or whitened areas 38 register as a binary number one and therefore as a positive time value, whereas the darkened or blackened areas 40 represent a binary zero, and thus no time value.

Each triggering area 36a-36h running along the y-axis is arranged across from either a blackened or whitened section of the colored pattern along the x-axis. These triggering areas 36a-36h running along the y-axis on each token 30-34 mark the position for the counters of each succeeding digit in the binary code. Thus, the first bit of each of the three digits [hours (hundreds), minutes (tens), minutes (units)] are read simultaneously as are the 2nd, 3rd and 4th bits. Three triggering squares actually read the binary coded information of the black and white color pattern; and two of the round triggering dots are logically "anded" to convey a "ready to read" the next digit signal to the counters.

As indicated in FIG. 5, the optical reader of the present invention consists of an array of five infrared emitters E1-E5 and detectors D1-D5 for reading the three binary digits and two triggering rectangles totalling five rectangles for the reading of the coded information in each quadrant. This array resembles or acts as a matrix of optically triggered two-position or binary switches. These binary switches are arranged in a linear array such that each binary switch represents a single digit hour, or a ten minute interval or a unit minute interval in a decimal system as mentioned previously, and each binary switch is responsible for reading its respective value from the three 4 bit binary coded decimal digits encoded on each token 30-34 in FIGS. 6a-6c.

The binary encoding of the tokens of FIGS. 6a-6c, as mentioned previously, is represented by the black and white color pattern, and aids therefore in understanding how the tokens in these FIGS. 6a-6c may be read by the array of binary switches constituted by the five infrared emitters and detectors in the photo detecting system of FIG. 5. This photo detecting system of the present invention reads the lower left-hand quadrant of each token in FIGS. 6a-6c. Due to the symmetry of the white and black areas 38, 40 respectively of the tokens 30-34 in these FIGS. 6a-6c with respect to the quadrants bounded by the negative and positive x and y axis shown therein, the coded information is always read by the emitters and detectors regardless of the tokens' orientation when passing by photo-detecting means. Light emitted through the token is received by its cooperative detector which sends a signal to the control circuitry designated in the flow diagram of FIG. 7, and as mentioned previously, is represented as a binary number one. Light restricted from passing through the darkened areas naturally is not received by the detector of its cooperative emitter and therefore no signal is sent to the circuitry thus representing a zero number.

FIG. 7 will now be described. The arrows indicate input and/or output to the components in the various blocks numbered and described hereinafter, which operation of these various components will be given shortly. While the individual components and substitution thereof may be readily known to those skilled in the art, for the purpose of providing a clearer disclosure, an additional description of these components in the system shown in FIG. 7 is provided herein.

A token reader is designated by number 50. It consists of the 5 element infrared emitter detector array of FIG. 5 and an interface plug which connects to the display board 28 where its signals undergo some simple processing and are arranged for connection to the input port of the microprocessor. A suitable emitter-detector pair is that available from Texas Instruments.

A relay circuit is designated by number 52. It consists of a 12 volt DC relay 22 shown in FIGS. 1 and 3; a buffer transistor, and a signal conditioning opto-isolator. A suitable relay is that available from Phillips ECG under the designation of Model NO. RYP11D15-12.

Number 54 designates an AC time base circuit. This circuit takes 24 volt AC from the power supply board 26 (FIGS. 1 and 3) and rectifies and conditions the output such that a 5 volt, 60 cycle TTL compatible clock base is created for the micro-processor-counter software. A suitable transistor is that available from General Electric under the designation of Model No. 2N3903.

Display latches are designated by number 56. These I.C.s are 4-bit tri-state latches that are multiplexed by the software such that the 4 bits of BCD information for each digit of the display are sequentially supplied to their respective decoder drivers. Suitable display latches are available from Texas Instruments.

An LED display decoder driver is designated by Number 58. These I.C.s are seven segments and receive 4 bits of BCD information (a number). Decoding this information will light the correct segments of their conjunctive display. Suitable decoder drivers are available from Texas Instruments.

A 3 digit, 7 segment LED display is designated by Number 60. This consists of a single digit I.C. and a two digit display. A suitable display is available from General Instrument Co.

Number 62 designates a microcomputer. This consists of a serial data transmitter and a complimentary receiver. These I.C.s also condition the data signals from TTL standard 5 Volt to RS232 standard (15V logic levels. A suitable microcomputer is available from Atlantis Computer Company of Astoria, N.Y. under the designation of part number MCG 85. The I.C.s for this system may be the following:

A standard 8 bit micro-processor, with a peripheral I.C. which provides two 8-bit ports; one 6-bit port, and a counter timer which are controllable and directly interfaceable with the micro-processor. A suitable micro-processor and peripheral I.C. are available from National Semiconductors under the designation of Nos. 8085 and 8155, respectively.

A standard 8 bit tristate latch or buffer, and a memory system decoder which through control signals from the 8085 access all available memory.

Both of these I.C.s are available from Texas Instruments under the designation of Model No. 74L5374 and 74LS138.

A EPROM System which consists of a possible 4K of ultraviolet erasable programmable read only memory and a RAM system consisting of 4×1K Random Access Memory. A suitable EPROM system is available from Electronics Inc. and the RAM system is available from Motorola.

System port latches consisting of two-4 bit latches. Suitable latches are available from Texas Instruments.

As further shown in FIG. 7, relay 52 is connected to an outlet 62, in which an appliance, designated as 64 is plugged into. Block 66 indicates the standard 110 volt outlet the device of the invention is plugged into. Operation of the components represented in FIG. 7 is as follows: the token device is plugged into a standard 110 volt outlet indicated by 66, which then sets the clock 54 to run. A token is inserted and the token reader 50 picks up the signals and sends the amount of time indicated on the token into the microcomputer 62. The computer 62 trips a relay 52 connected to the outlet 62 for the appliance 64 while at the same time through latches 56 and decoder drivers 58 the amount of time for operation of the appliance appears in the display 60.

It is apparent that future computer systems may consist of an increase in I/O ports and memory.

With the token system described above, particularly with regard to FIGS. 6a-6c up to 9 hours and 59 minutes can be registered in the circuit. This can be achieved by counters in the circuit which accumulate the time values of the tokens. The time value of the token of FIG. 6a is 60 minutes; that of FIG. 6b is 15 minutes; and that of FIG. 6c is 30 minutes.

Due to the design of these tokens in FIGS. 6a-6c, and in view of what has been discussed above, it is easily appreciated that these tokens may be inserted in the slot 16 of the housing 10 of the electronic device in any orientation, i.e., lengthwise, sidewise, backwards, etc., and still be read by the photo-detecting system of the present invention.

The user of the electronic device 10 of the invention deposits a token or token of FIGS. 6a-6c into the slot. The token travels by gravity down between a sensor and receiver which are the infrared emitters and detectors, which register its time value, and records it, and accumulates it on a countdown timer. Instead of the token being fed by gravity down into the electronic device 10, it is possible to provide motors whereby such feeding could be automated. The buzzer may be activated toward the end of the timing cycle and/or the three digit LED display 20 (FIG. 1) may be used to indicate the total amount of time remaining for operation of the electronic device, and therefore, the appliance.

Through the teachings of the invention, it can readily be appreciated that it is designed to prevent counterfeit tokens from being used and to prevent unauthorized recovery of genuine tokens after being dropped into the box-like housing. The authenticity of the coin is effected by the electronic interrogation system of FIG. 7. Additionally, the computer can be programmed to accept only certain denominations.

As mentioned previously, the microcomputer system shown in FIG. 7 may consist of an 8-bit microprocessor including peripheral I.C. which provides 2 I/O ports and a programmable timer, 2K of system ROM, 2K of system RAM, RS 232 communication I.C.s and some steering logic. As mentioned earlier, a suitable system may be available from Atlantis Computer Company of Astoria, New York, identified as part number MCG 85, described earlier, in regard to number 62. The programmable I/O ports allow direct interfacing of the optical reading system represented by the circuitry in FIG. 5 and the LED display discussed above. Together these systems form a fully integrated programmable controller for a relay or set of relays for activating and deactivating power to the appliance.

The use of erasable programmable ROM provides the system designer with almost any conceivable option for a control scheme for reading of the tokens. The software used in the prototype system of the present invention includes means for the optical reading of the tokens; means for counting the accumulated time registered by one or more tokens deposited into the box of the device; means for count-downing the accumulated time; and means for identifying the time value denomination on the token. Due to the software for performing these functions, the electronic device of the present invention is programmed to accept only the tokens with the time value or denominations on the tokens of FIGS. 6a-6c, and if the user were to create his own tokens, these tokens would not be accepted by the system of the present invention.

By means which are apparent to one skilled in the art, the electronic device of the invention can be set up to be optionally operable or inoperable at certain designated hours of the day.

As a method of modifying a behavior of a subject, upon the completion of a task or in the exhibition of good conduct, the token of the invention is given to the subject, and its time value can be equated with the value placed on that particular form of behavior.

The token oriented behavior modification device of the invention is designed to help parents reduce their children's overuse of an electronic entertainment device (EEA), while at the same time increase activities that parents feel are desirable. Such activities may be active such as doing a certain activity or inactive such as behaving or not behaving in a certain manner. To use the system, the child must insert the token into the electronic device to use the EEA, such as a television, a stereo, a VCR or a computer.

By distributing the tokens, parents control the amount of EEA use available to their child. Parents may suggest alternative activities that they feel are desirable, such as family or peer activities, school work, etc. and reward the child with a token after he has completed the activity. The system is designed to help parents decrease the child's overuse of the EEA while increasing more desirable behavior. The system is also designed as a temporary program used to help structure a child's behavior pattern.

While for convenience of illustration the token has been illustrated as being a film between two sheets of a transparent synthetic resin, the token may comprise of opaque material where the dots are sensitized to be detected by a sensing means. Also, the invention has been explained with utilization of infrared light for detection of the information on the token; however, any matched emitters and detectors can be used. The tokens are described as being gravity fed, but provisions can be made for the token to be motored through, pneumatically fed, etc.

The device 10 of the invention is programmable and can communicate with the user/operator with the appropriate hardware additions.

Whereas, a particular embodiment of the invention has been described above for purposes of illustration, it will be evident to those skilled in the art that numerous variations of the details may be made without departing from the invention as defined in the appended claims.

We claim:

1. A device for electronically operating an electronic apparatus which device is photoelectrically actuated by a token which passes between a light source and receiving system, comprising:
   a housing comprising:
   slot means into which said token is inserted by a user and which travels past said light source and receiving system,
   containment means having a plug for electrically connecting said electronic apparatus to said device and for retaining spent said tokens, said token being a body of material having a plurality of regions on opposite faces of said token, each said region having light transmitting and light restricting portions and being arranged in said body of material to facilitate receipt of said light source and activation of control signals in said system irrespective of the orientation of said token in said device, said light and receiving system being an optical reader with a plurality of emitters and a plurality of cooperative detectors for generating said control signals, said portions of each region of said token being an encoded time value pattern in the form of four bit binary coded decimal digits and triggering areas along said opposite faces of said token adapted to indicate the reading of and the preparation for the reading of said binary coded decimal digits in logical order by said optical reader, and an electronic circuit means for operating said device and said electronic apparatus, including said optical reader, a microprocessor for receiving and processing said control signals, counter means for accumulating time acquired by insertion of a plurality of said spent tokens, and digital readout means for displaying the remaining time for said operation of said electronic apparatus, said regions of said token consisting of two top adjacent quadrants and two bottom adjacent quadrants, each having said encoded information pattern, said triggering area of said token being located along a central longitudinal axis separating two of said quadrants from said other two quadrants of said opposite faces of said token, and being adapted for registering said light transmitting portions and said light restricting portions on said body material in a predetermined sequence for said activation of said control signals, said body of material consisting of at least two sheets of a transparent material and a photo-developed plastic film encased between said two sheets upon which said encoded pattern is recorded.

2. A device of claim 1, wherein said transparent material is said light transmitting portion and said photo-developed plastic film is said light restricting portion.

3. A device of claim 1, wherein said optical reader consists of an array of five infrared pairs of emitters and detectors for reading in each quadrant at least three of said binary coded decimal digits and for detecting at least two of said triggering areas for an "anded" operation in said microprocessor.

4. A device of claim 3, wherein said array is a matrix of optically triggered two-position or binary switches.

5. A device of claim 1, wherein said encoded information of said token is in a base numbering system.

6. A device of claim 1, wherein said encoded information pattern is adapted to represent time in hours, tens of minutes, and unit minutes representation.

7. A device of claim 1, wherein said encoded information pattern consists of binary coded decimal digits wherein said light transmitting portion represents a binary number one and said light restricting portion represents a binary zero.

8. A device for electronically operating an electronic apparatus which device is photoelectrically actuated by a token which passes between a light source and receiving system, comprising:

a housing comprising:

slot means into which said token is inserted by a user and which travels past said light source and receiving system, containment means having a plug for electrically connecting said electronic apparatus to said device and for retaining spent said tokens, said token being a body of material having a plurality of regions on opposite faces of said token, each said region having light transmitting and light restricting portions and being arranged in said body of material to facilitate receipt of said light source and activation of control signals in said system irrespective of the orientation of said token in said device, said light and receiving system being an optical reader with a plurality of emitters and a plurality of cooperative detectors for generating said control signals, said portions of each region of said token being an encoded time value pattern in the form of four bit binary coded decimal digits and triggering areas along said opposite faces of said token adapted to indicate the reading of and the preparation for the reading of said binary coded decimal digits in logical order by said optical reader, and an electronic circuit means for operating said device and said electronic apparatus, including said optical reader, a microprocessor for receiving and processing said control signals, counter means for accumulating time acquired by insertion of a plurality of said spent tokens, and digital readout means for displaying the remaining time for said operation of said electronic apparatus, said regions of said token consisting of two top adjacent quadrants and two bottom adjacent quadrants, each having said encoded information pattern, said triggering areas of said token being located along a central longitudinal axis to separate two of said quadrants from said other two quadrants of said opposite faces of said token, and being adapted to register said light transmitting portions and said light restricting portions on said body material in a predetermined sequence for said activation of said control signals, said optical reader consisting of an array of a plurality of pairs of emitters and detectors for reading in each said quadrant said binary coded decimal digits and for detecting said triggering areas for an "anded" operation in said microprocessor.

* * * * *